United States Patent
Chen et al.

(10) Patent No.: US 8,390,741 B2
(45) Date of Patent: Mar. 5, 2013

(54) IMAGE PROCESSING APPARATUS AND IMAGE PROCESSING METHOD

(75) Inventors: Mei-Ju Chen, Hsinchu Hsien (TW); Jen-Shi Wu, Hsinchu Hsien (TW); Wei-Kuo Lee, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 411 days.

(21) Appl. No.: 12/762,736

(22) Filed: Apr. 19, 2010

(65) Prior Publication Data

US 2010/0271551 A1 Oct. 28, 2010

(30) Foreign Application Priority Data

Apr. 22, 2009 (TW) .............................. 98113314 A

(51) Int. Cl.
*H04N 5/00* (2011.01)
(52) U.S. Cl. ........................................ 348/624; 348/607
(58) Field of Classification Search .................. 348/634, 348/607, 624
See application file for complete search history.

(56) References Cited

U.S. PATENT DOCUMENTS

| 4,646,138 A * | 2/1987 | Willis .............................. 348/621 |
| 5,130,789 A * | 7/1992 | Dobbs et al. .................... 358/500 |
| 5,959,693 A * | 9/1999 | Wu et al. ......................... 348/624 |
| 6,807,300 B1 * | 10/2004 | Gindele et al. ................. 382/167 |
| 2008/0019601 A1 * | 1/2008 | Amagai ........................... 382/254 |

* cited by examiner

*Primary Examiner* — Jefferey Harold
*Assistant Examiner* — Michael Teitelbaum
(74) *Attorney, Agent, or Firm* — Andy M. Han; Han IP Law PLLC

(57) ABSTRACT

An image processing apparatus comprises an image decoding unit and a static noise reducing unit. The image decoding unit decodes a data stream and generates a plurality of image comprising a current image. The static noise reducing unit, coupled to the image decoding unit, generates a first adjustment value of a target pixel of the current image according to an original luminance value of the target pixel and at least one original luminance value of a neighboring pixel associated with the target pixel. The static noise reducing unit also determines a static adjustment luminance value of the target pixel according to the original luminance value, the first adjustment value, and a first weight. The first weight is associated with the chrominance value of the target pixel.

14 Claims, 11 Drawing Sheets

Figure.7

IMAGE PROCESSING APPARATUS AND IMAGE PROCESSING METHOD

CROSS REFERENCE TO RELATED PATENT APPLICATIONS

This patent application claims priority from Taiwan Patent Application No. 098113314, filed in the Taiwan Patent Office on Apr. 22, 2009, and incorporates the Taiwan patent application in its entirety by reference.

TECHNICAL FIELD

The present disclosure relates to an image processing apparatus, and more particularly, to an image processing apparatus and an image processing method capable of determining a noise processing level according to chrominance values of an image.

BACKGROUND OF THE PRESENT DISCLOSURE

In a common television (TV) system, noise processing is performed on an image data (e.g., a frame data or a field data) to adjust luminance values of the image data, and the adjusted image data is further processed and displayed on a TV display. However, during the noise processing, a same noise processing approach is applied on each pixel of the image data; that is, regardless of complexity on details of various blocks, e.g., blocks with complicated details (such as lawns or leaves) in the image or blocks with simple details (such as the sky or the skin of a person) in the image, a same noise processing level is used. Accordingly, when high-level noise processing is used, the area having complicated details is excessively processed such that image details become too obscure to be displayed. When low-degree noise processing is used, the noise processing may be unsatisfactory for blocks with simple details, such that noise is not effectively restrained to undesirably affect image quality.

SUMMARY OF THE PRESENT DISCLOSURE

Therefore, one object of the present disclosure is to provide an image processing apparatus and an image processing method capable of determining a noise processing level according to chrominance values of an image to solve the foregoing problem.

According to an embodiment of the present disclosure, an image processing apparatus comprises an image decoding unit and a static noise reducing unit. The image decoding unit, for decoding a data stream to generate a plurality of image comprising a current image. The static noise reducing unit, coupled to the image decoding unit, for generating a first adjustment value of a target pixel of the current image according to an original luminance value of the target pixel and at least one original luminance value of a neighboring pixel associated with the target pixel, and for determining a static adjustment luminance value of the target pixel according to the original luminance value, the first adjustment value and a first weight. The first weight is associated with the chrominance value of the target pixel.

According to another embodiment of the present disclosure, an image processing method comprises decoding a data stream to generate a plurality of image data comprising a current image; providing a first weight lookup table comprising a plurality of weigh values corresponding to different chrominance values; generating a first adjustment value of a target pixel of the current image according to an original luminance value of the target pixel and at least one original luminance value of a neighboring pixel associated with the target pixel; and determining a first static adjustment luminance value of the target pixel according to the original luminance value, the first adjustment value and a first weight; wherein the first weight corresponds to a chrominance value of the target pixel.

According to another embodiment of the present disclosure, an image processing apparatus comprises an image decoding unit and a dynamic reducing unit. The image decoding unit, for decoding a data stream to generate a plurality of image data comprising a current image and a previous image, wherein the current image has a target pixel and the previous image has a corresponding pixel mapping to the target pixel. The dynamic noise reducing unit for determining an adjustment value according to a luminance difference and a weight, and for determining a dynamic adjustment luminance value of the target pixel according to the adjustment value, an original luminance value of the target pixel and a previous luminance value of the corresponding pixel. And the luminance difference is calculated the difference between the original luminance value and the previous luminance value, and the weight is determined by a chrominance value of the target pixel.

According to an image processing apparatus and an image processing method in accordance with embodiments of the present disclosure, a noise processing level for processing a pixel data of an image data is determined according to a chrominance value, such that noise processing is performed with a proper level on the pixel data of the image data to improve image quality.

BRIEF DESCRIPTION OF THE DRAWINGS

FIG. 7 is a schematic diagram of a second weight lookup table.

DETAILED DESCRIPTION OF THE PREFERRED EMBODIMENT

Figure 1:
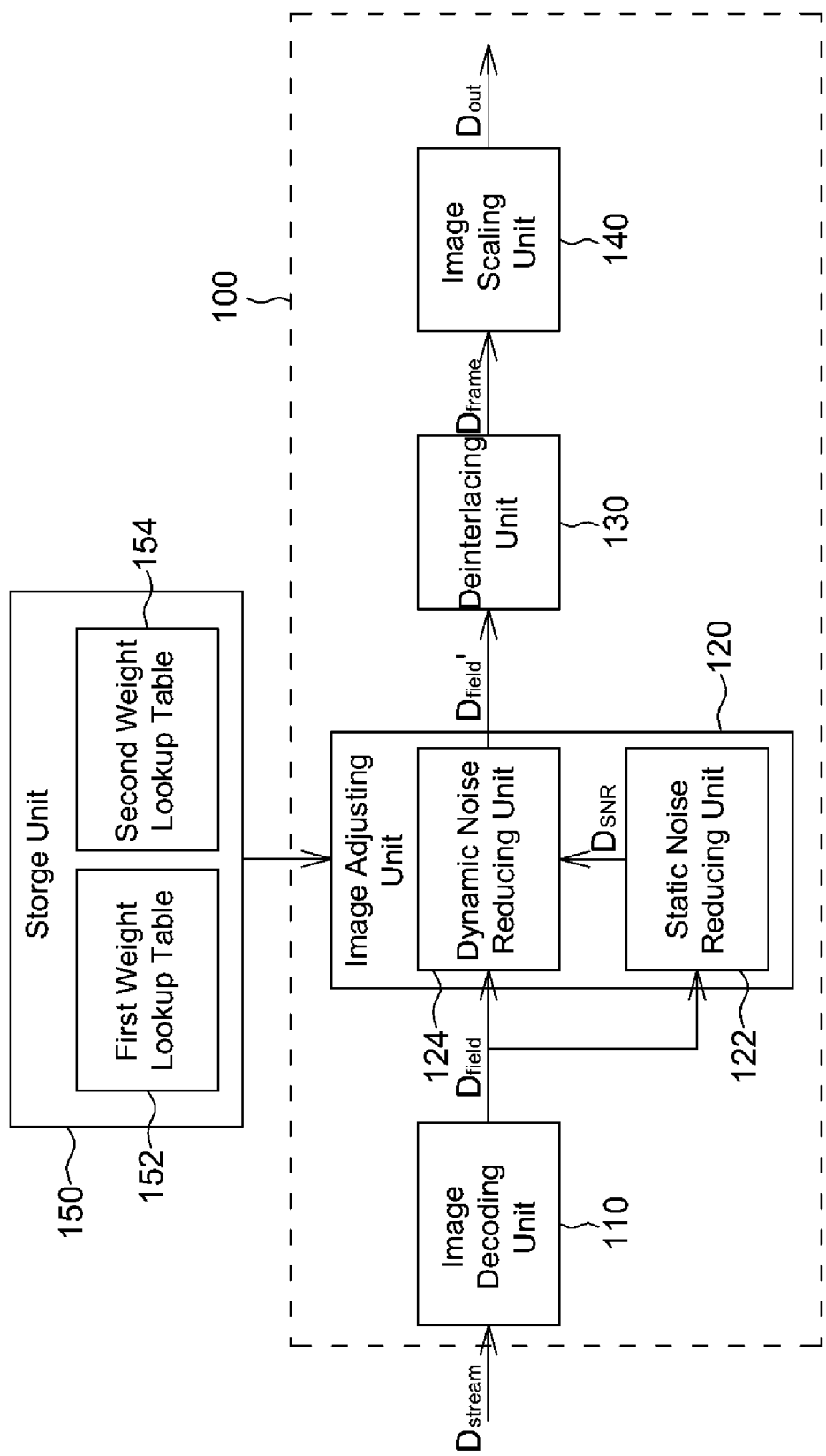
FIG. 1 is a schematic diagram of an image processing apparatus in accordance with a first embodiment of the present disclosure.

FIG. 1 shows a schematic diagram of an image processing apparatus in accordance with a first embodiment of the present disclosure. An image processing apparatus 100 comprises an image decoding unit 110, an image adjusting unit 120, a de-interlacing unit 130 and an image scaling unit 140. The image adjusting unit 120 comprises a static noise reducing unit 122 and a dynamic noise reducing unit 124. In addition, the image adjusting unit 120 is coupled to a storage unit 150 comprising a first weight lookup table 152 and a second weight lookup table 154. For example, the image processing apparatus 100 may be implemented via a hardware or software approach.

Figure 2:
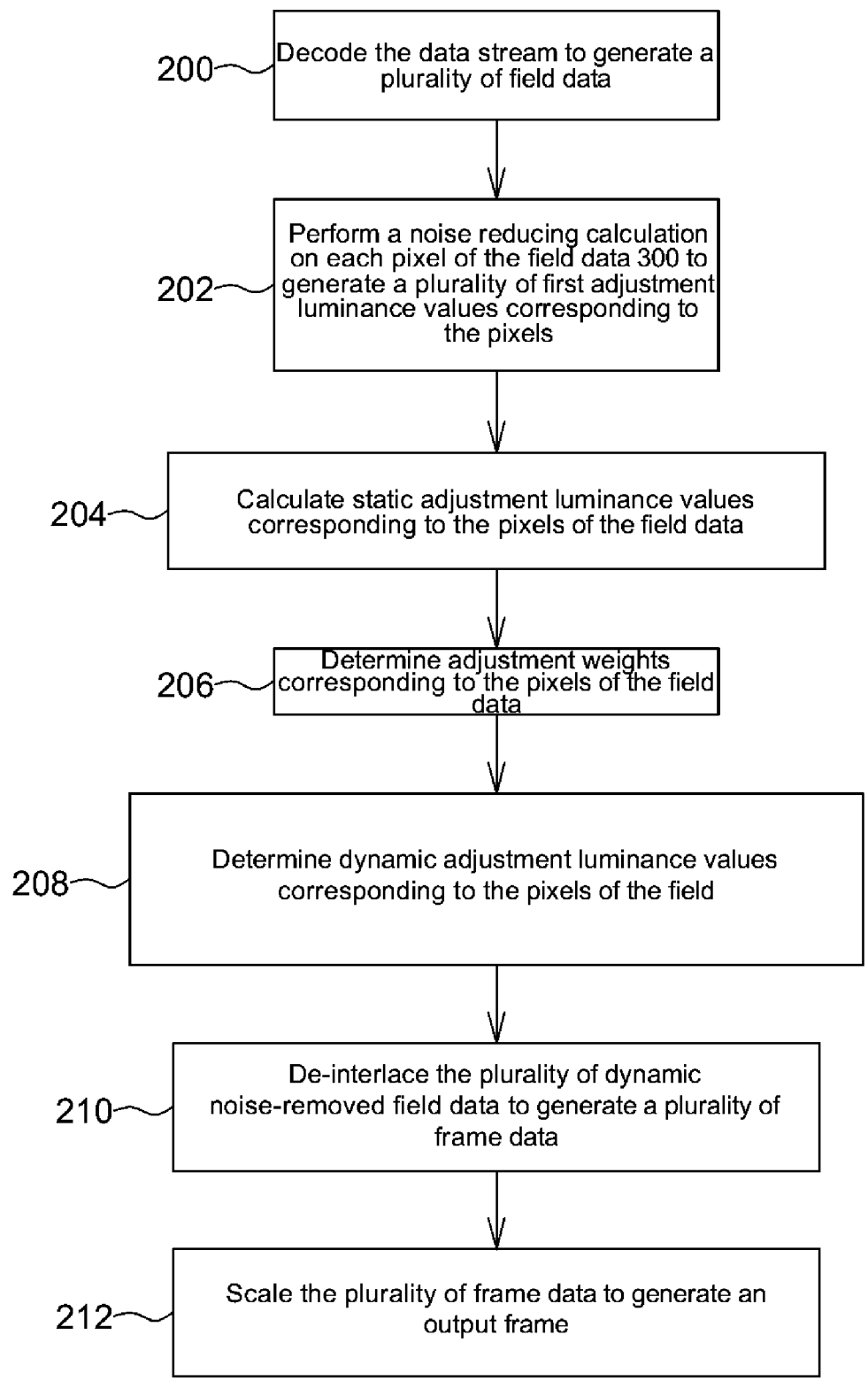
FIG. 2 is a flowchart of performing image processing on a data stream ($D_{stream}$) by the image processing apparatus illustrated in FIG. 1.
Figure 3:
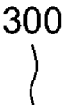
FIG. 3 is a schematic diagram of a field data.

FIG. 2 shows a flowchart of performing image processing on a data stream $D_{stream}$ by the image processing apparatus 100. In Step 200, the image decoding unit 110 decodes the data stream $D_{stream}$ to generate a plurality of field data $D_{field}$. FIG. 3 is a schematic diagram of a field data 300 comprising luminance values and chrominance values of pixels $P_{11}$, $P_{12}$, $P_{13}$ . . . . In Step 202, the static noise reducing unit 122 performs a noise reducing calculation on each pixel of the field data 300 to generate a plurality of first adjustment luminance values corresponding to the pixels. Taking a pixel $P_{12}$ of the field data 300 for example, a first luminance value $Y_{12}'$ is calculated as:

$$Y_{12}' = a_1 * Y_{11} + a_2 * Y_{12} + a_3 * Y_{13},$$

where $Y_{11}$, $Y_{12}$ and $Y_{13}$ are original luminance values of the pixels $P_{11}$, $P_{12}$ and $P_{13}$, and $a_1$, $a_2$ and $a_3$ are constants such as ¼, 2/4 and ¼, or ⅕, ⅗ and ⅕, respectively. Taking the pixel $P_{13}$ of the field data 300 for example, a first adjustment luminance value $Y_{13}'$ of the pixel $P_{13}$ is calculated via a similar calculation for the first adjustment luminance value $Y_{12}'$ as:

$$Y_{13}' = a_1 * Y_{12} + a_2 * Y_{13} + a_3 * Y_{14},$$

where $Y_{14}$ is an original luminance value of a pixel $P_4$. When a first adjustment luminance value $Y_{xy}'$ of a pixel $P_{xy}$ is to be calculated, the static noise reducing unit 122 by weight adds horizontally adjacent pixels to generate the first adjustment luminance value $Y_{xy}'$ of the pixel $P_{xy}$. Accordingly, the static noise reducing unit 122 calculates the plurality of first adjusting luminance values $Y_{11}'$, $Y_{12}'$, $Y_{13}'$ . . . of the pixels $P_{11}$, $P_{12}$, $P_{13}$ . . . , respectively.

Note that the foregoing formulas for calculating the first adjusting luminance values $Y_{11}'$, $Y_{12}'$, $Y_{13}'$ . . . are described as an example, and other approaches may be applied to other embodiments of the present disclosure to calculate a first adjustment luminance value of each of the pixels. For example, two-dimensional (2D) adjacent pixels are used for adjusting a luminance value of a pixel $P_{22}$ of the field data 300, and a first adjustment luminance value $Y_{22}'$ of the pixel $P_{22}$ is calculated as:

$$Y_{22}' = a_{11}*Y_{11} + a_{12}*Y_{12} + a_{13}*Y_{13} + a_{21}*Y_{21} + a_{22}*Y_{22} + a_{23}*Y_{23} + a_{31}*Y_{31} + a_{32}*Y_{32} + a_{33}*Y_{33},$$

where $Y_{11}$ to $Y_{33}$ are original luminance values of pixels $P_{11}$ to $P_{33}$, and $a_{11}$ to $a_{33}$ are constants. In other words, provided that the first adjustment luminance value $Y_{xy}'$ of the pixel $P_{xy}$ is determined according to the pixel $P_{xy}$ and an original luminance value of at least one pixel adjacent to the pixel $P_{xy}$, the approach for calculating the first adjusting luminance values $Y_{11}'$, $Y_{12}'$, $Y_{13}'$ . . . can be modified to adapt to user considerations.

After the plurality of first adjusting luminance values $Y_{11}'$, $Y_{12}'$, $Y_{13}'$ . . . of the pixels $P_{11}$, $P_{12}$, $P_{13}$ . . . are calculated, in Step 204, the static noise reducing unit 122 calculates each of the pixels of the field data 300 to generate a static adjustment luminance value corresponding to each of the pixels. Taking the pixel $P_{12}$ of the field data 300 for example, a static adjustment luminance value $Y_{12\_SNR}$ of the pixel $P_{12}$ is calculated as:

$$Y_{12\_SNR} = W*Y_{12}' + (1-W)*Y_{12},$$

where $Y_{12}$ and $Y_{12}'$ are respectively an original luminance value and a first adjustment luminance value of the pixel $P_{12}$, and W is a weight corresponding to a chrominance value of the pixel $P_{12}$. The weight W is located from the first weight lookup table 152 comprising a plurality of weights corresponding to different chrominance values.

Figure 4:
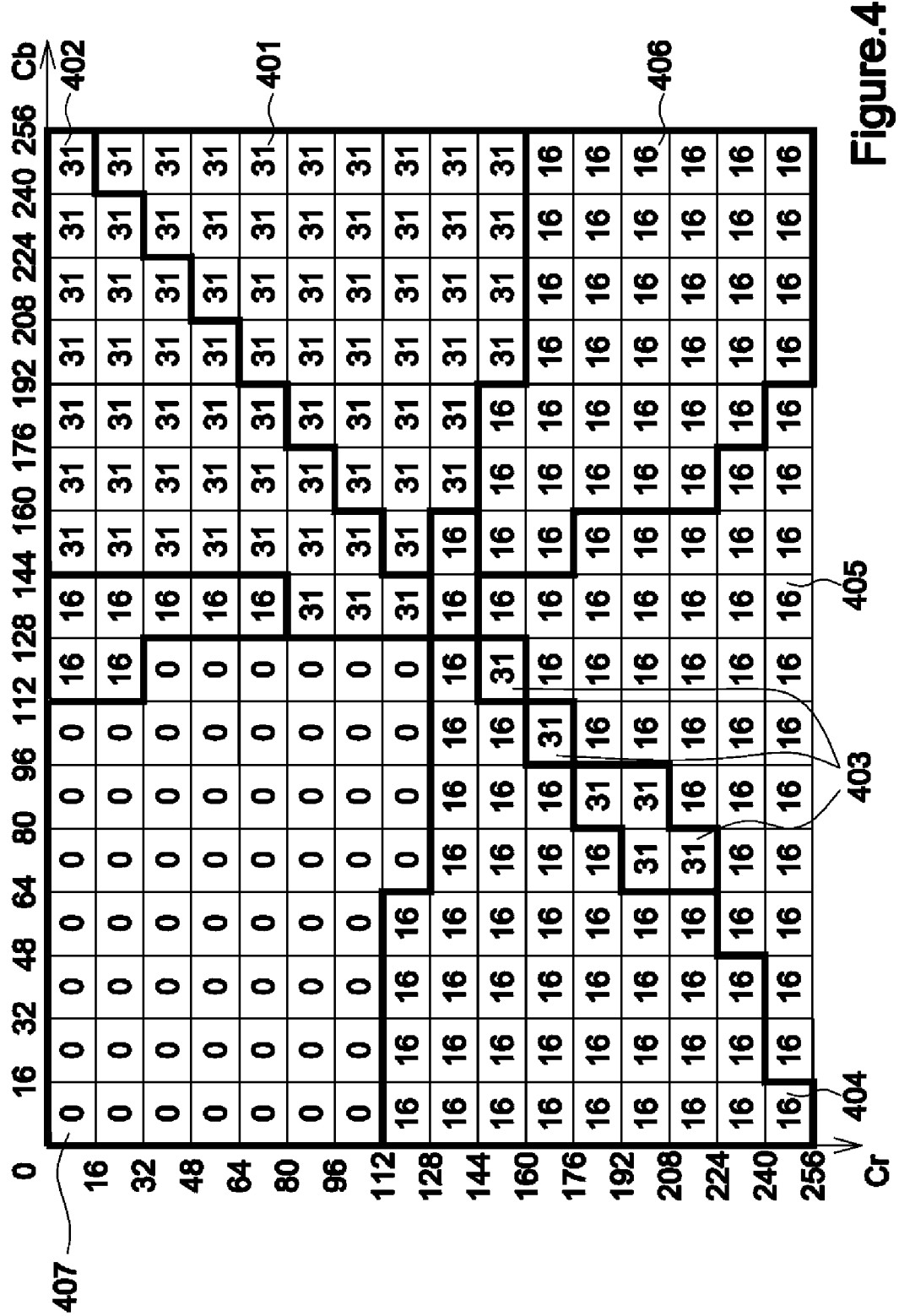
FIG. 4 is a schematic diagram of a first weight lookup table.

FIG. 4 shows a schematic diagram of a first weight lookup table 152 in accordance with a preferred embodiment of the present disclosure. It is to be noted that, in this embodiment, a weight having 5 bits needs to be divided by 32 to generate a result to serve as a weight of the static adjustment luminance value $Y_{12\_SNR}$. For example, when "31" and "16" are located in the first weight lookup table 152, weights W are actually "31/32" and "16/32", respectively. Referring to FIG. 4, a chrominance value of a pixel is determined according to two chrominance components Cr and Cb, and each chrominance value has a corresponding weight. In addition, the weight lookup table 152 illustrated in FIG. 4 is roughly divided into 7 blocks 401 to 407. The blocks 401 to 403 may be blue, cyan and skin tone with the greater weight 31/32; the blocks 404 to 406 may be yellow, red and pink with the smaller weight 16/32; and the block 407 may be green with a smallest weight 0. Note that the number, ranges and weights of the blocks are described for illustration purposes, and a designer can determine the number, ranges and weights of the blocks to adapt to various design considerations. However, according to a preferred embodiment of the present disclosure, design modifications that blocks of blue and skin tone have a greater weight and the blocks of green has a smaller weight are within the scope and spirit of the present disclosure.

For example, supposing two chrominance components Cb and Cr of the pixel $P_{12}$ of the field data 300 are 225 and 70, respectively, the chrominance value of the pixel $P_{12}$ thus lies within the block 401 (i.e., having a chrominance value of blue) and the weight W is 31/32. Therefore, the static adjustment luminance value $Y_{12\_SNR}$ of the pixel $P_{12}$ is calculated as:

$$Y_{12\_SNR} = (31/32)*Y_{12}' + (1/32)*Y_{12};$$

when the pixel $P_{12}$ has a chrominance value of blue, the weight of the first adjustment luminance value $Y_{12}$ is much greater than that of the original luminance value $Y_{12}$; that is, the static adjustment luminance value $Y_{12\_SNR}$ is rather close to the first adjustment luminance value $Y_{12}'$. In other words, when the chrominance value of the pixel $P_{12}$ is blue, noise processing of a high level is selected for calculating the static adjusting chrominance value $Y_{12\_SNR}$.

For example, supposing that the two chrominance components Cb and Cr of the field data 300 are 6 and 30, respectively, the chrominance value of the pixel $P_{12}$ thus lies within the block 407 (i.e., having a chrominance value of blue) and the weight W is 0. Therefore, the static adjustment luminance value $Y_{12\_SNR}$ of the pixel $P_{12}$ is calculated as:

$$Y_{12\_SNR} 0*Y_{12}' + 1*Y_{12};$$

when the pixel $P_{12}$ has a chrominance value of green, the weight of the first adjustment value $Y_{12}'$ is 0, and the weight of the original luminance value $Y_{12}$ is 1; that is, the static adjustment luminance value $Y_{12\_SNR}$ is the original luminance value $Y_{12}$. In other words, when chrominance value of the pixel $P_{12}$ is green, noise processing is not performed or noise processing of a low level is selected for calculating the static adjusting chrominance value $Y_{12\_SNR}$.

Note that the weight W for calculating the static adjustment luminance value $Y_{12\_SNR}$ is directly obtained by looking up a table. However, in other embodiments of the present disclosure, the weight W for calculating the static adjustment luminance value $Y_{12\_SNR}$ is determined not only according to, from the first weight lookup table 152, a weight corresponding to the chrominance value of the pixel $P_{12}$, but also simultaneously according to, from the first weight lookup table 152, weights corresponding to the chrominance values of the pixel $P_{11}$ and $P_{13}$, or is determined via an interpolation approach. For example, suppose that, from the first weight lookup table 152, the weights corresponding to the chrominance values of the $P_{11}$, $P_{12}$ and $P_{13}$ are respectively $W_1$, $W_2$ and $W_3$. The weight W for calculating the static adjustment luminance value $Y_{12\_SNR}$ is calculated as:

$$W = a_1 * W_1 + a_2 W_2 a_3 * W_3,$$

where $a_1$, $a_2$ and $a_3$ are constants such as 1/4, 2/4 and 1/4, or 1/5, 3/5 and 1/5, respectively.

The concept of calculating a static adjustment luminance value of a pixel is briefly described below. Generally, most blue blocks or skin tone blocks of an image are blocks with simple details such as the sky or the skin of a person, and most green blocks of the image are blocks with complicated details such as lawns or leaves. In order to achieve an optimal noise processing effect without excessively blurring image edges, the blocks with simple details need more noise processing, and the blocks with complicated details need less noise processing to avoid blurring the image edges. Therefore, the static noise reducing unit 122 according an embodiment of the present disclosure by weight adds the original luminance value of the pixel to the first adjustment value to generate the static adjustment luminance value. When a pixel has a chrominance value of blue or skin tone (i.e., being a simple image), a weight is greater than that of an original luminance value; that is, and the static adjustment luminance value of the pixel needs a higher level of noise processing. When a pixel has a chrominance value of green (i.e., being an image with many details), the weight of the first adjustment value is smaller than that of the original luminance value; that is, the static adjustment luminance value of the pixel almost needs no noise processing, and the static adjustment luminance value is equal to the original luminance value. Accordingly, noise processing of a proper level is performed on each of the pixels of the field data 300 to improve image quality.

By performing the foregoing calculations on each pixel of a plurality of field data $D_{field}$, the static noise reducing unit 122 generates a plurality of adjusted field data $D_{SNR}$, with a luminance value of each pixel of the adjusted field data $D_{SNR}$ being the foregoing static adjustment luminance value. Next, the dynamic noise reducing unit 124 performs dynamic noise reducing on the plurality of adjusted field data $D_{SNR}$ to further improve the image quality. Following description discloses an operation flow of the dynamic noise reducing unit 124.

Figure 5:
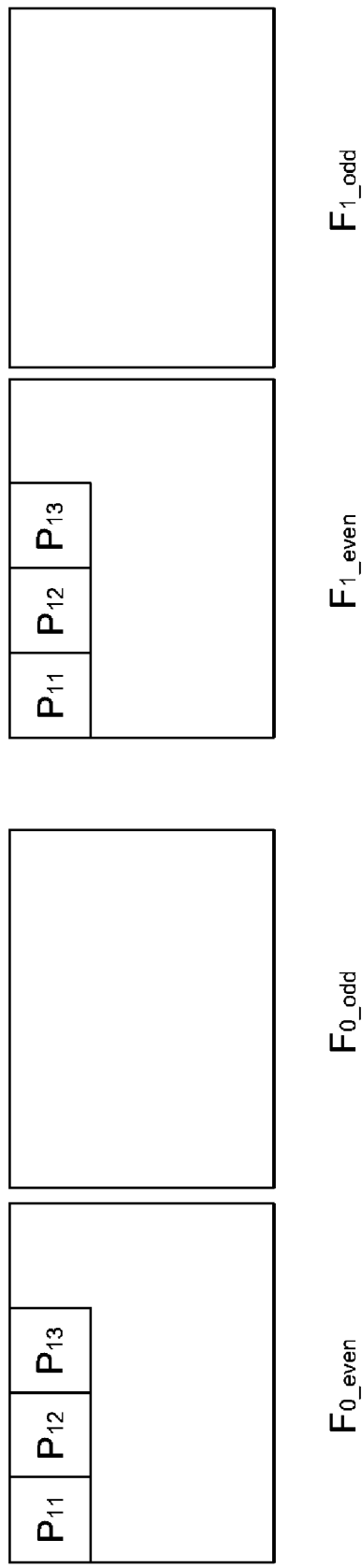
FIG. 5 is a schematic diagram of a plurality of field data $D_{field}$.

FIG. 5 is a schematic diagram of a plurality of field data $D_{field}$ comprising $F_{0\_even}$, $F_{0\_odd}$, $F_{1\_even}$ and $F_{1\_odd}$. $F_{0\_even}$ is an even field of a previous field, $F_{0\_odd}$ is an odd field of the previous field, $F_{1\_even}$ is an even field of a current field, and $F_{1\_odd}$ is an odd field of the current field. In addition, $F_{0\_even}$ and $F_{1\_even}$ have pixels at same positions of an image; that is, pixels $P_{11}$, $P_{12}$ and $P_{13}$, of $F_{0\_even}$ and $F_{1\_even}$ illustrated in FIG. 5 are at the same positions of the image.

Figure 6:
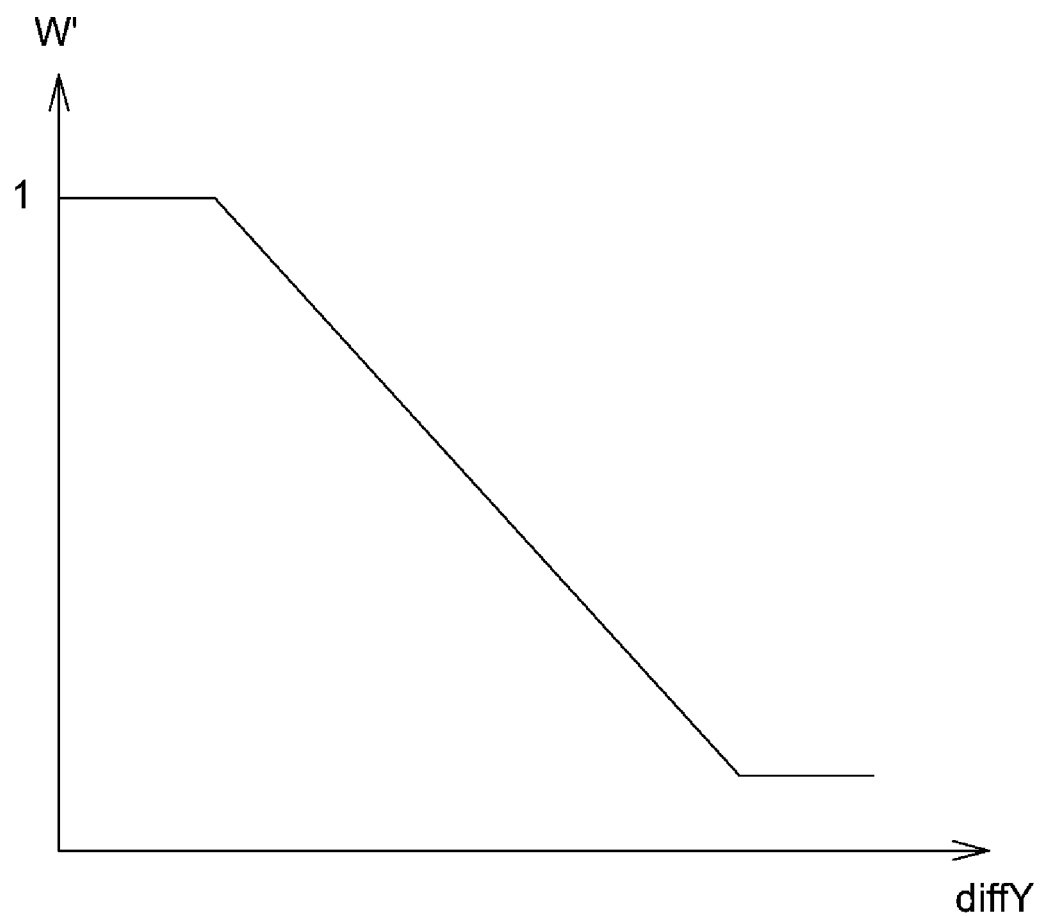
FIG. 6 is a characteristics curve diagram of a difference diffY and a parameter W'.

Referring to FIG. 1, FIG. 2 and FIG. 5, in Step 206 of FIG. 2, suppose that the dynamic noise reducing unit 124 performs dynamic noise reducing on the adjusted field data $F_{1\_even}$. Taking the pixel $P_{12}$ illustrated in FIG. 5 for example, the dynamic noise reducing unit 124 first determines a second adjustment value K, which is generated as:

$$K = W' * W''$$

where the parameter W' is determined via a characteristics curve illustrated in FIG. 6, and the parameter W" is determined via the second weight lookup table 154 illustrated in FIG. 1. Referring to FIG. 6, diffY is a difference between a dynamic adjustment luminance value (also referred to as an output luminance value) of a pixel at a previous field data and a static adjustment luminance value of the pixel at a same position at a current field data; alternatively, the dynamic adjustment luminance value may be instead of an original luminance value or a static adjustment luminance value. Taking the pixel $P_{12}$ for example, diffY is represented as:

$$\text{diffY} = Y_{1\_12\_SNR} - Y_{0\_12\_DNR},$$

where $Y_{1\_12\_SNR}$ is a static adjustment luminance value of the pixel $P_{12}$ in the even field $F_{1\_even}$, and $Y_{0\_12\_DNR}$ is a dynamic adjustment luminance value of the pixel $P_{12}$ in the even field $F_{0\_even}$. In the characteristics curve illustrated in FIG. 6, the difference diffY is more or less inversely correlated with the parameter W'.

Figure 7:
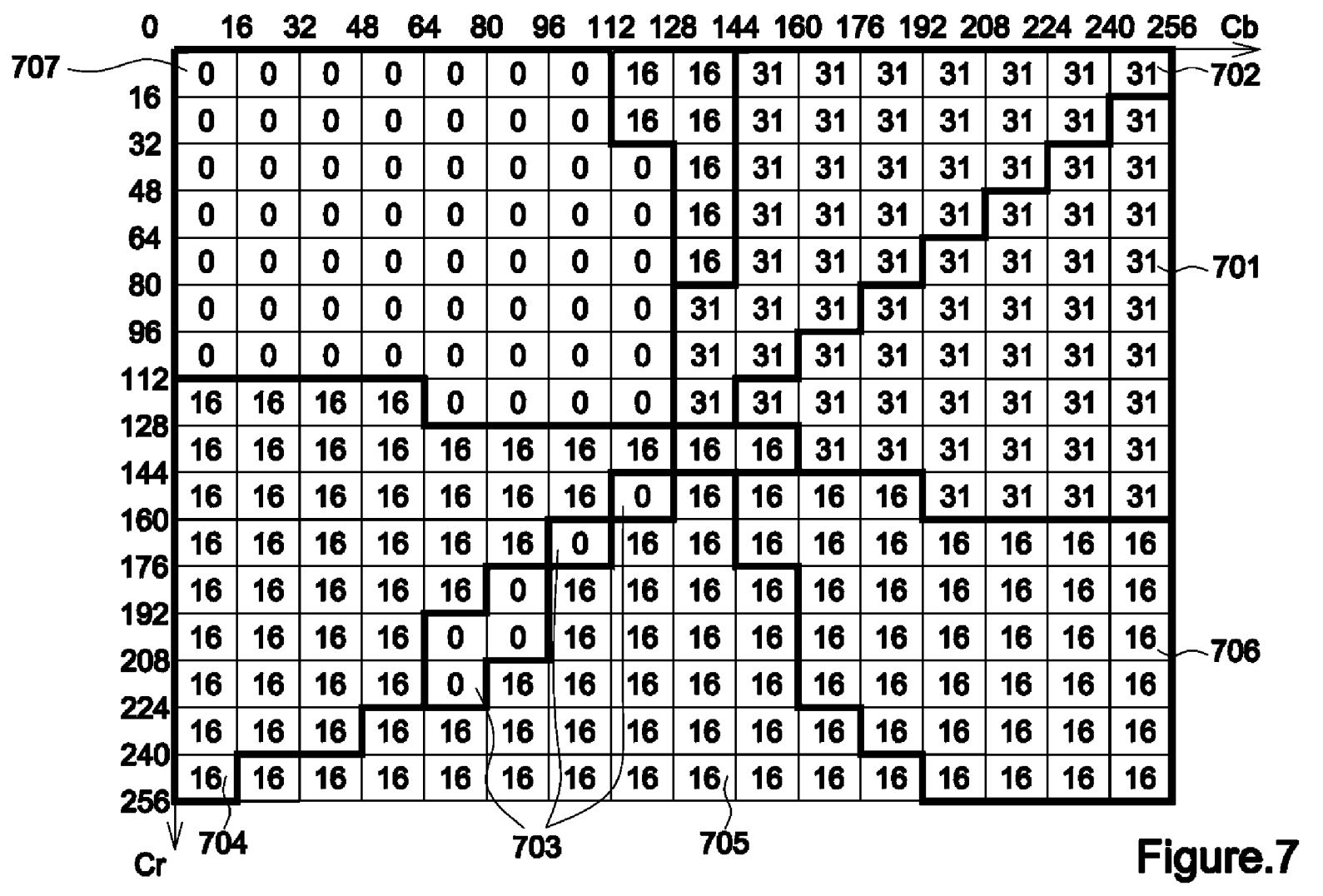

In addition, FIG. 7 is a schematic diagram of a second weight lookup table 154 in accordance with a preferred embodiment of the present disclosure. It is to be noted that, in this embodiment, a weight having 5 bits first needs to be divided by 32 to generate a result to serve as a weight of a dynamic adjustment luminance value $Y_{12\_DNR}$. For example, when "31" and "16" are located in the second weight lookup table 154, weights W" are actually "31/32" and "16/32", respectively. The second weight lookup table 154 illustrated in FIG. 7 is roughly divided into 7 blocks 701 to 707. The blocks 701 to 702 may be blue and cyan with the greater weight 31/32, the blocks 704 to 706 may be yellow, red or pink with the smaller weight 16/32, and the block 703 and 707 are skin tone and green with a smallest weight 0. Note that the number, ranges and weights of the blocks are described for illustration purposes, and a designer can determine the number, ranges and weights of the blocks to adapt to various design considerations. However, according to a preferred embodiment of the present disclosure, design modifications that blocks of blue and cyan have a greater weight and blocks of skin tone and green have a smaller weight are within the scope and spirit of the present disclosure.

The dynamic noise reducing unit 124 determines the parameter W" according to, from the second weight lookup table 154, a weight corresponding to chrominance values of pixels of the current field data $F_{1\_even}$. For example, supposing that two chrominance components Cb and Cr of the pixel $P_{12}$ of the field data $F_{1\_even}$ are respectively 232 and 70, the chrominance value of the pixel $P_{12}$ thus lies within the block 701 (i.e., having a chrominance value of blue), and the weight W" is 31/32.

In Step 208, the dynamic noise reducing unit 124 determines a dynamic adjustment luminance value according to a second adjustment value K, and a static adjustment luminance value of a pixel at the current field data $F_{1\_even}$ and a dynamic adjustment luminance value (also referred to as an output luminance value) of the pixel at a same position at the previous field data $F_{0\_even}$. Taking the pixel $P_{12}$ for example, a dynamic adjustment luminance value $Y_{1\_12\_DNR}$ of the pixel $P_{12}$ at the current field data $F_{1\_even}$ is calculated as:

$$Y_{1\_12\_DNR} = K * Y_{0\_12\_DNR} + (1-K) * Y_{1\_12\_SNR},$$

where $Y_{0\_12\_DNR}$ is a dynamic adjustment luminance value of the pixel $P_{12}$ at the previous field data $F_{0\_even}$, and $Y_{1\_12\_SNR}$ is a static adjusting luminance value of the pixel $P_{12}$ at the current field data $F_{1\_even}$.

By performing the noise reducing on all pixels, the dynamic noise reducing unit 124 generates a plurality of dynamic noise-removed field data $D_{field}'$ to the de-interlacing unit 130.

In Step 210, the de-interlacing unit 130 de-interlaces the plurality of dynamic noise-removed field data $D_{field}'$ to generate a plurality of frame data $D_{frame}$. In Step 212, the image scaling unit 140 scales the plurality of frame data $D_{frame}$ to generate a display data $D_{out}$ to be transmitted to a display.

It is to be noted that, in the embodiment illustrated in FIG. 1, the field data $D_{field}$ is processed first by the static noise reducing unit 122 and then by the dynamic noise reducing unit 124 to generate the dynamic noise-removed field data $D_{field''}$. However, in other embodiments of the present disclosure, the adjusted field data $D_{SNR}$ outputted by the dynamic noise reducing unit 122 may also be directly outputted by the image adjusting unit 120, and the de-interlacing unit 130 de-interlaces the field data $D_{SNR}$ to generate the plurality of frame data $D_{frame}$. That is, the design modifications that the dynamic noise reducing unit 124 of the image processing apparatus 100 illustrated in FIG. 1 may be left out and the storage unit 150 need not store the second weight lookup table 154 are also within the scope and spirit of the present disclosure.

Figure 8:
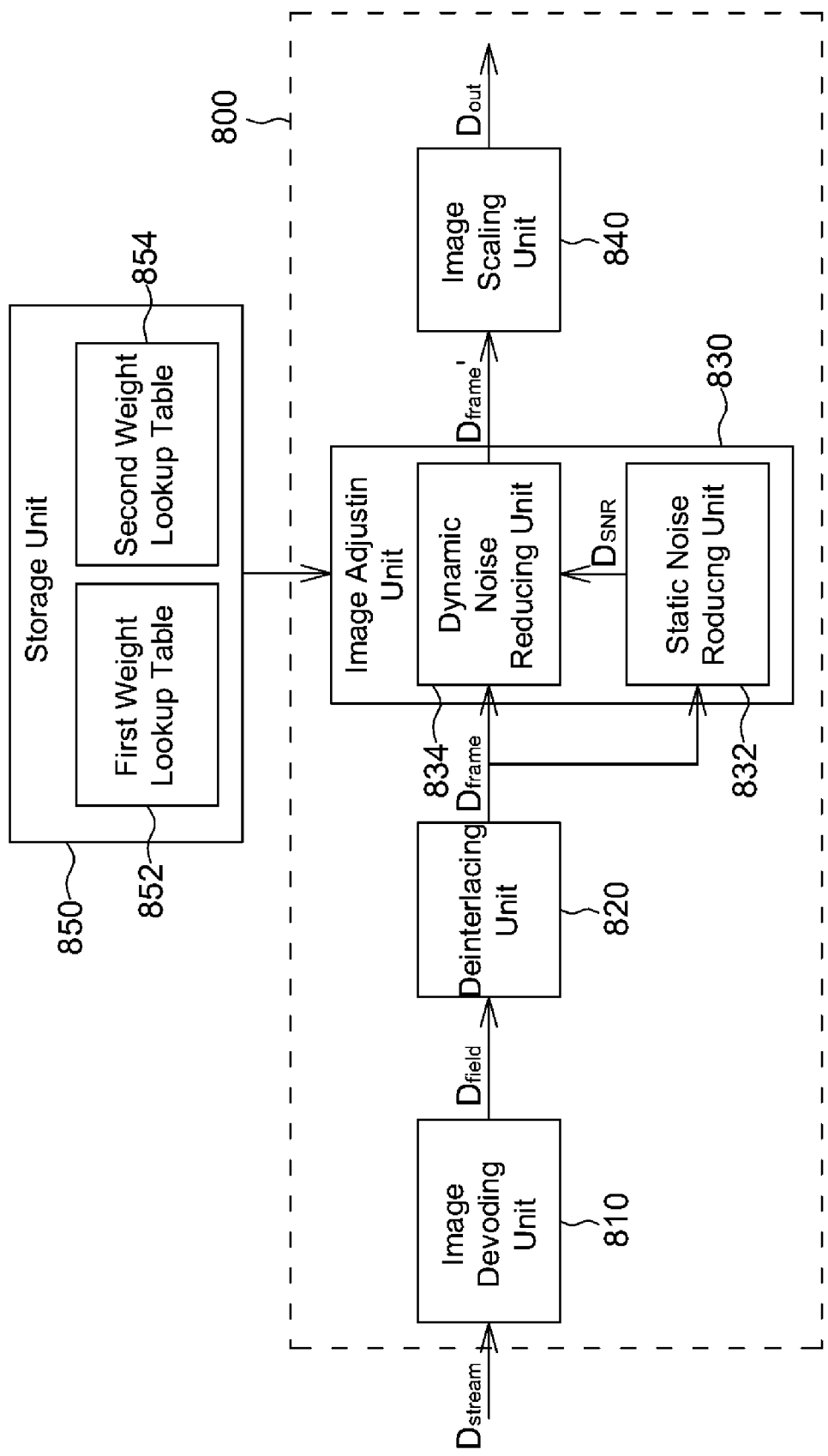
FIG. 8 is a schematic diagram of an image processing apparatus in accordance with a second embodiment of the present disclosure.

FIG. 8 is a schematic diagram of an image processing apparatus 800 in accordance with a second embodiment of the present disclosure. The image processing apparatus 800 comprises an image decoding unit 810, a de-interlacing unit 820, an image adjusting unit 830 and an image scaling unit 840. The image adjusting unit 830, comprising a static noise reducing unit 832 and a dynamic noise reducing unit 834, is coupled to a storage unit 850 comprising a first weight lookup table 852 and a second weight lookup table 854. In addition, the image processing apparatus 800 is implemented via a hardware or software approach.

A difference between the image processing apparatus 800 and the image processing apparatus 100 illustrated in FIG. 1 is that the image adjusting unit 120 of the image processing apparatus 100 adjusts field data and the image adjusting unit 830 of the image processing apparatus 800 adjusts frame data. Other than that, operations of the static noise reducing unit 832 and the dynamic noise reducing unit 834 of the image adjusting unit 830 are similar to those of the static noise reducing unit 122 and the dynamic noise reducing unit 124 of the image adjusting unit 120. Therefore, the operation flow of the image processing apparatus 800 is easily deduced by a person having ordinary skill in the art after reading the description associated with the image processing apparatus 100, and details thereof shall not be described for brevity.

Figure 9:
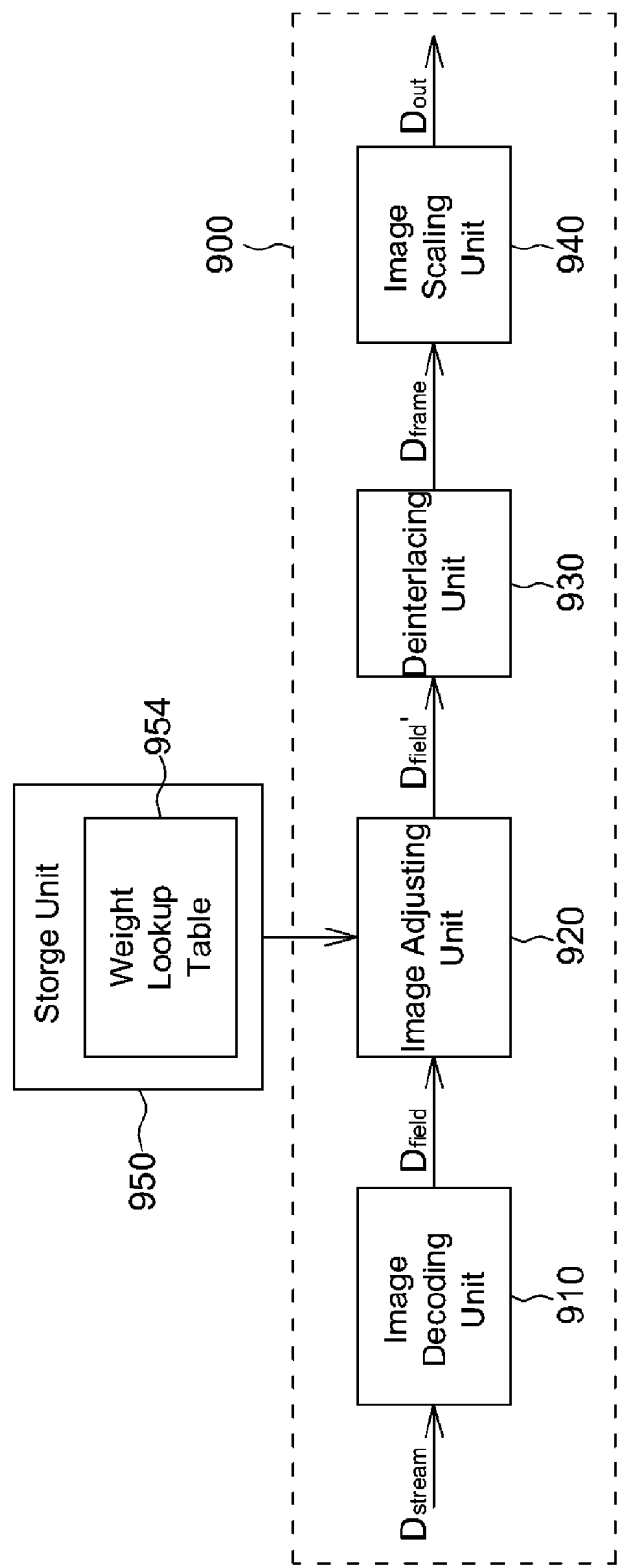
FIG. 9 is a schematic diagram of an image processing apparatus in accordance with a third embodiment of the present disclosure.

FIG. 9 is a schematic diagram of an image processing apparatus 900 in accordance with a third embodiment of the present disclosure. The image processing apparatus 900 comprises an image decoding unit 910, an image adjusting unit 920, a de-interlacing unit 930 and an image scaling unit 940. In addition, the image processing apparatus is implemented via a hardware or software approach.

Figure 10:
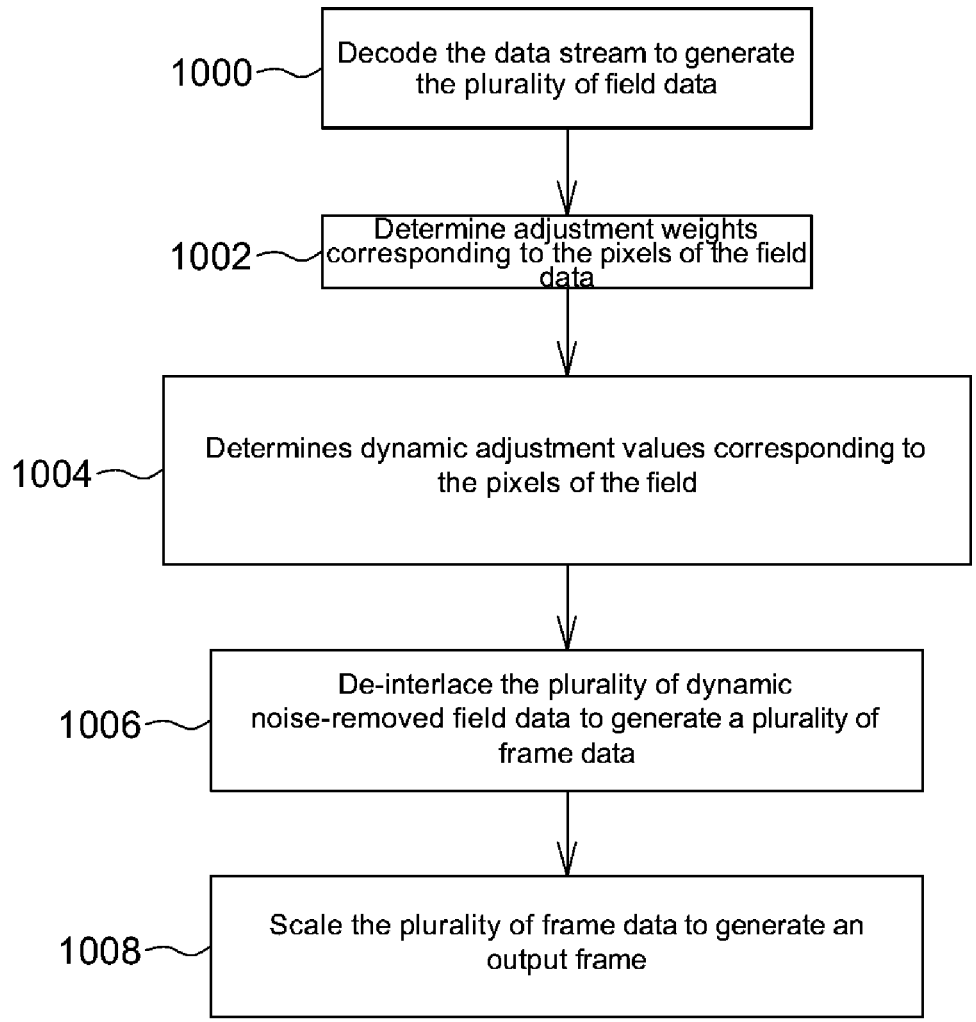
FIG. 10 is a flowchart of performing image processing on a data stream $D_{stream}$ by the image processing apparatus illustrated in FIG. 9.

Referring to FIG. 9 and FIG. 10, FIG. 10 is a flowchart of performing image processing on a data stream $D_{stream}$ by the image processing apparatus 900. In Step 1000, an image decoding unit 910 decodes the data stream $D_{stream}$ to generate the plurality of field data $D_{field}$ illustrated in FIG. 5.

In Step 1002, referring to FIG. 5, FIG. 9 and FIG. 10, suppose that the image adjusting unit 920 adjusts the field data $F_{1\_even}$. Taking the pixel $P_{12}$ illustrated in FIG. 5 for example, the image adjusting unit 920 first determines a second adjustment value K, which is calculated as:

$$K = W' * W'',$$

where the parameter W' is determined by the characteristics curve illustrated in FIG. 6, and the parameter W'' is determined via a weight lookup table 954 stored in the storage unit 950 illustrated in FIG. 9. Referring to FIG. 6, diffY is a difference between a dynamic adjustment luminance value (also referred to as an output luminance value) of a pixel at a previous field data and an original luminance value of the pixel at a same position at a current field data; alternatively, the dynamic adjustment luminance value may also be an original luminance value. Taking the pixel $P_{12}$ for example, diffY is represented as:

$$\text{diffY} = Y_{1\_12} - Y_{0\_12\_DNR},$$

where $Y_{1\_12}$ is an original luma value of the pixel $P_{12}$ at the even field $F_{1\_even}$, and $Y_{0\_DNR}$ is a dynamic adjusting luminance value of the pixel $P_{12}$ at the even field $F_{0\_even}$.

In addition, FIG. 7 shows a schematic diagram of the weight lookup table 954, which is roughly divided into 7 blocks 701 to 707. The blocks 701 and 702 are respectively a blue block and a cyan block with a greater weight 31/32; the blocks 704 to 706 are respectively a yellow block, a red block and pink block with a smaller weight 16/32; and the blocks 703 and 707 are respectively a skin tone block and a green block with a smallest weight 0. The image adjusting unit 920 determines the parameter W'' according to, from the weight lookup table 954, a weight corresponding to a chrominance value of a pixel at the current field data $F_{1\_even}$. For example, supposing that two chrominance components Cb and Cr of the pixel $P_{12}$ at the field data $F_{1\_even}$ are respectively 232 and 70, the chrominance value of the pixel $P_{12}$ thus lies within the block 701 (i.e., having a chrominance value of blue), and the weight W'' is 31/32.

In Step 1004, the image adjusting unit 920 determines a dynamic adjustment value (also referred to as an output luminance value) according to a second adjustment value K of the pixel, an original luminance value of the current data $F_{1\_even}$ and a dynamic adjustment luminance value of the previous field data $F_{0\_even}$. Taking the pixel $P_{12}$ for example, the dynamic adjustment luminance value $Y_{1\_12\_DNR}$ of the pixel $P_{12}$ at the current field data $F_{1\_even}$ is calculated as:

$$Y_{1\_12\_DNR} = K * Y_{0\_12\_DNR} + (1-K) * Y_{1\_12},$$

where $Y_{0\_12\_DNR}$ is a dynamic adjustment luminance value of the pixel $P_{12}$ at the previous field data $F_{0\_even}$, and $Y_{1\_12}$ is an original luminance value of the pixel $P_{12}$ at the current field data $F_{1\_even}$.

In Step 1006, the de-interlacing unit 930 de-interlaces a plurality of adjusted field data $D_{field}'$ to generate a plurality of frame data $D_{frame}$. In Step 1008, the image scaling unit 940 scales the plurality of frame data $D_{frame}$ to generate a display data $D_{out}$ to be transmitted to a display.

Figure 11:
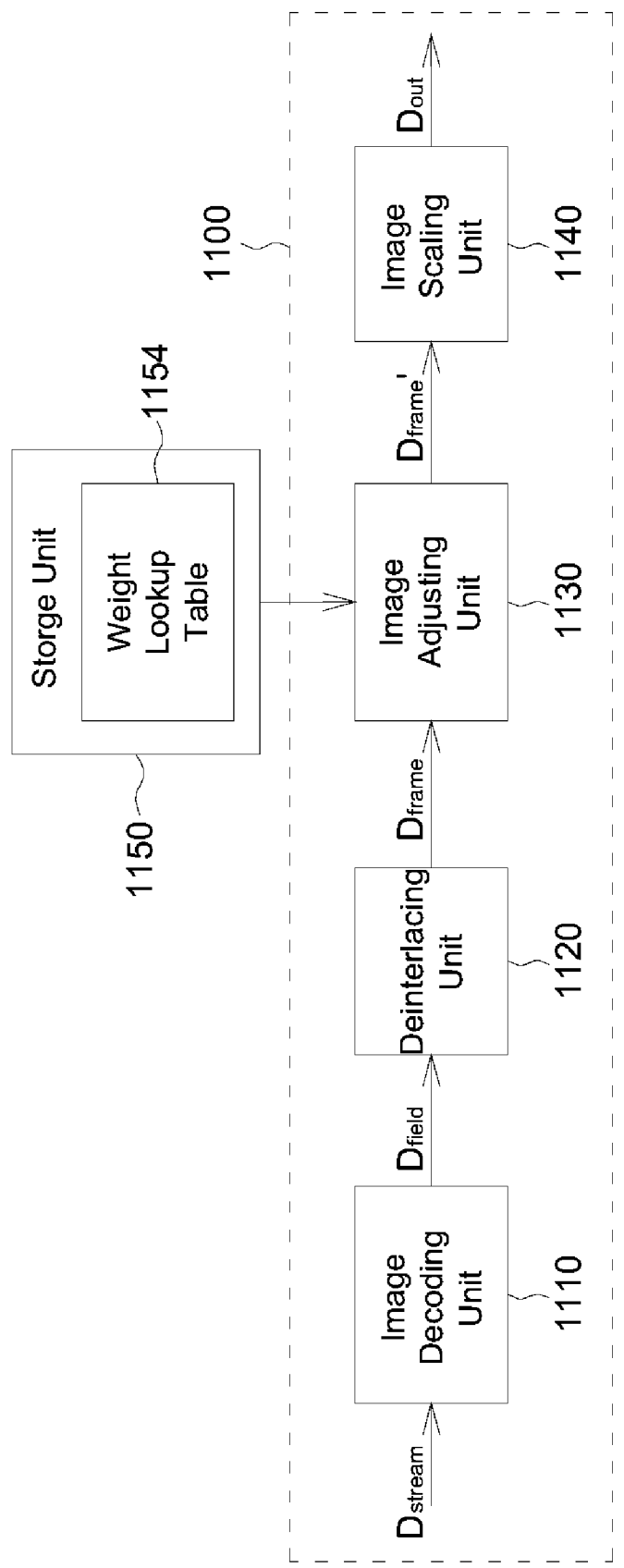
FIG. 11 is a schematic diagram of an image processing apparatus in accordance with a fourth embodiment of the present disclosure.

FIG. 11 is a schematic diagram of an image processing apparatus 1100 in accordance with a fourth embodiment of the present disclosure. The image processing apparatus 1100 comprises an image decoding unit 1110, a de-interlacing unit 1120, an image adjusting unit 1130 and an image scaling unit 1140. The image adjusting unit 1130 is coupled to a storage unit 1150 comprising a weight lookup table 1154. In addition, the image processing apparatus 1100 is implemented via a hardware or software approach.

A difference between the image processing apparatus 1100 and the image processing apparatus 900 illustrated in FIG. 9 is that the image adjusting unit 920 of the image processing apparatus 900 adjusts field data and the image adjusting unit 1130 of the image processing apparatus 1100 adjusts frame data. Other than that, operations of the image adjusting unit 1130 are similar to those of the image adjusting unit 920. Therefore, the operation flow of the image processing apparatus 1100 is easily deduced by a person having ordinary skill in the art after reading the description associated with the image processing apparatus 900, and details thereof shall not be described for brevity.

In conclusion, with an image processing apparatus and an image processing method in accordance with an embodiment of the present disclosure, a noise processing level of a pixel data of an image is determined according to a chrominance value of the pixel. Accordingly, noise processing with a proper level is performed on the pixel data of the image to improve image quality.

While the disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image processing apparatus for adjusting the luminance value of a target pixel, the apparatus comprising:
   an image decoding unit that decodes a data stream to generate a plurality of images comprising a current image;
   a static noise reducing unit, coupled to the image decoding unit, that generates a first adjustment value of a target pixel of the current image according to an original luminance value of the target pixel and at least one original luminance value of a neighboring pixel associated with the target pixel, and determines a static adjustment luminance value of the target pixel according to the original luminance value, the first adjustment value, and a first weight, the first weight being associated with a chrominance value of the target pixel; and
   a dynamic noise reducing unit, coupled to the static noise reducing unit, that determines a second adjustment value according to a luminance difference and a second weight, and determines a dynamic adjustment luminance value of the target pixel according to the second adjustment value, the static adjustment luminance value, and a previous luminance value of a corresponding pixel of a previous image, the luminance difference being a difference between the static adjustment luminance value and the previous luminance value, the second weight being determined according to the chrominance value of the target pixel.

2. The image processing apparatus as claimed in claim 1, wherein the first weight corresponds to chrominance values of the target pixel and at least one neighboring pixel associated with the target pixel.

3. The image processing apparatus as claimed in claim 1, wherein the static noise reducing unit determines a static adjustment luminance value of the target pixel by performing weighted average on the original luminance value and the first adjustment value according to the first weight.

4. The image processing apparatus as claimed in claim 3, wherein the first weight for the original luminance value when the chrominance value of the target pixel representing color green is greater than the first weight for the original luminance value when the chrominance value of the target pixel represents color blue.

5. The image processing apparatus as claimed in claim 1, wherein the dynamic noise reducing unit determines a dynamic adjustment luminance value of the target pixel by performing weighted average on the static adjustment luminance value and the previous luminance value according to the second adjustment value.

6. The image processing apparatus as claimed in claim 5, wherein the previous luminance value is one of an original luminance value, a static adjustment luminance value, and a dynamic adjustment luminance value of the corresponding pixel of the previous image.

7. An image processing method for adjusting the luminance value of a target pixel, the method comprising:
   decoding a data stream to generate a plurality of image data comprising a current image;
   providing a first weight lookup table comprising a plurality of weigh values corresponding to different chrominance values, wherein the first weight corresponds to chrominance values of the target pixel and at least one neighboring pixel associated with the target pixel;
   generating a first adjustment value of a target pixel of the current image according to an original luminance value of the target pixel and at least one original luminance value of a neighboring pixel associated with the target pixel;
   determining a first static adjustment luminance value of the target pixel according to the at least one original luminance value, the first adjustment value, and a first weight, the first weight being associated with a chrominance value of the target pixel
   determining a second adjustment value according to a luminance difference and a second weight; and
   determining a dynamic adjustment luminance value of the target pixel according to the second adjustment value, the static adjustment luminance value and a previous luminance value of a corresponding pixel of a previous image, the luminance difference being the difference between the static adjustment luminance value and the previous luminance value, the second weight being determined according to the chrominance value of the target pixel.

8. The image processing method as claimed in claim 7, wherein the first static adjustment luminance value is determined by performing weighted average on the original luminance value and the first adjustment value according to the first weight.

9. The image processing method as claimed in claim 8, wherein the first weight for the original luminance value when the chrominance value of the target pixel representing color green is greater than the first weight for the original luminance value when the chrominance value of the target pixel represents color blue.

10. The image processing method as claimed in claim 7, wherein the dynamic adjustment luminance value of the target pixel is determined by performing weighted average on the static adjustment luminance value and the previous luminance value according to the second adjustment value.

11. The image processing method as claimed in claim 10, wherein the previous luminance value is one of an original luminance value, a static adjustment luminance value, and a dynamic adjustment luminance value of the corresponding pixel of the previous image.

12. An image processing apparatus for adjusting a luminance value of a target pixel, the apparatus comprising:
   an image decoding unit that decodes a data stream and generates a plurality of image data comprising a current image and a previous image, the current image having the target pixel, the previous image having a corresponding pixel mapped to the target pixel; and a dynamic noise reducing unit that determines an adjustment value according to a luminance difference and a weight, and determines a dynamic adjustment luminance value of the target pixel according to the adjustment value, an original luminance value of the target pixel, and a previous luminance value of the corresponding pixel, the luminance difference representing a difference between the original luminance value and the previous luminance value, the weight being determined according to a chrominance value of the target pixel.

13. The image processing apparatus as claimed in claim 12, wherein the dynamic noise reducing unit determines a dynamic adjustment luminance value of the target pixel by performing weighted average on the original luminance value and the previous luminance value according to the adjustment value.

14. The image processing apparatus as claimed in claim 13, wherein the previous luminance value is one of an original luminance value and a dynamic adjustment luminance value of the corresponding pixel of the previous image.

* * * * *